United States Patent
Kale

(10) Patent No.: US 11,733,763 B2
(45) Date of Patent: Aug. 22, 2023

(54) INTELLIGENT LOW POWER MODES FOR DEEP LEARNING ACCELERATOR AND RANDOM ACCESS MEMORY

(71) Applicant: Micron Technology, Inc., Boise, ID (US)

(72) Inventor: Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 141 days.

(21) Appl. No.: 16/987,127

(22) Filed: Aug. 6, 2020

(65) Prior Publication Data

US 2022/0043502 A1  Feb. 10, 2022

(51) Int. Cl.
| | | |
|---|---|---|
| *G06F 1/26* | (2006.01) | |
| *G06F 1/32* | (2019.01) | |
| *G06F 1/3234* | (2019.01) | |
| *G06F 1/3296* | (2019.01) | |
| *G06F 1/3287* | (2019.01) | |
| *G06F 1/3228* | (2019.01) | |
| *G06F 17/16* | (2006.01) | |
| *G06N 3/08* | (2023.01) | |
| *G06F 9/50* | (2006.01) | |
| *G06F 9/30* | (2018.01) | |
| *G06N 3/063* | (2023.01) | |

(52) U.S. Cl.
CPC ........ *G06F 1/3275* (2013.01); *G06F 1/3228* (2013.01); *G06F 1/3287* (2013.01); *G06F 1/3296* (2013.01); *G06F 9/3001* (2013.01); *G06F 9/5027* (2013.01); *G06F 17/16* (2013.01); *G06N 3/063* (2013.01); *G06N 3/08* (2013.01)

(58) Field of Classification Search
CPC .................................................... G06F 1/3275
See application file for complete search history.

(56) References Cited

U.S. PATENT DOCUMENTS

| | | | |
|---|---|---|---|
| 9,530,466 B1 * | 12/2016 | Zhu | G06F 12/0292 |
| 2012/0324251 A1 * | 12/2012 | Bolanowski | G06F 12/023 |
| | | | 713/300 |
| 2013/0290753 A1 | 10/2013 | Ramaraju et al. | |
| 2013/0304981 A1 * | 11/2013 | Paz | G11C 7/1072 |
| | | | 711/105 |

(Continued)

OTHER PUBLICATIONS

International Search Report and Written Opinion, PCT/US2021/042704, dated Oct. 29, 2021.

*Primary Examiner* — Mohammed H Rehman
(74) *Attorney, Agent, or Firm* — Greenberg Traurig

(57) ABSTRACT

Systems, devices, and methods related to a Deep Learning Accelerator and memory are described. For example, an integrated circuit device may be configured to execute instructions with matrix operands and configured with random access memory that includes multiple memory groups having independent power modes. The random access memory is configured to store data representative of parameters of an Artificial Neural Network and representative of instructions executable by the Deep Learning Accelerator to perform matrix computation to generate an output of the Artificial Neural Network. During execution of the instructions, a power manager may adjust grouping of memory addresses mapped into the memory groups and adjust power modes of the memory groups to reduce power consumption and to avoid performance impact.

27 Claims, 9 Drawing Sheets

(56) References Cited

U.S. PATENT DOCUMENTS

| | | | |
|---|---|---|---|
| 2014/0047251 A1* | 2/2014 | Kottilingal | G06F 12/0292 |
| | | | 711/170 |
| 2014/0115596 A1* | 4/2014 | Khan | G06F 9/50 |
| | | | 718/104 |
| 2015/0213845 A1 | 7/2015 | Choi et al. | |
| 2015/0318048 A1* | 11/2015 | Kasai | G11C 16/0466 |
| | | | 365/185.18 |
| 2016/0124671 A1* | 5/2016 | Wang | G06F 3/0661 |
| | | | 713/323 |
| 2016/0275013 A1* | 9/2016 | Van Lunteren | G06F 12/0607 |
| 2016/0379115 A1* | 12/2016 | Burger | G06F 15/7803 |
| | | | 706/25 |
| 2017/0365305 A1 | 12/2017 | Chang et al. | |
| 2018/0165396 A1* | 6/2018 | Lin | G06F 3/0605 |
| 2018/0285732 A1* | 10/2018 | Kurian | G06F 1/3225 |
| 2019/0114105 A1 | 4/2019 | Cho | |
| 2019/0212805 A1* | 7/2019 | Grunzke et al. | G06F 1/3275 |

\* cited by examiner

INTELLIGENT LOW POWER MODES FOR DEEP LEARNING ACCELERATOR AND RANDOM ACCESS MEMORY

TECHNICAL FIELD

At least some embodiments disclosed herein relate to power management in integrated circuit devices in general and more particularly, but not limited to, power management of memory used by accelerators for Artificial Neural Networks (ANNs), such as ANNs configured through machine learning and/or deep learning.

BACKGROUND

An Artificial Neural Network (ANN) uses a network of neurons to process inputs to the network and to generate outputs from the network.

For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the network, as well as the bias, activation function, and synaptic weights of each neuron. Based on a given ANN model, a computing device can be configured to compute the output(s) of the network from a given set of inputs to the network.

For example, the inputs to an ANN network may be generated based on camera inputs; and the outputs from the ANN network may be the identification of an item, such as an event or an object.

In general, an ANN may be trained using a supervised method where the parameters in the ANN are adjusted to minimize or reduce the error between known outputs associated with or resulted from respective inputs and computed outputs generated via applying the inputs to the ANN. Examples of supervised learning/training methods include reinforcement learning and learning with error correction.

Alternatively, or in combination, an ANN may be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

Deep learning uses multiple layers of machine learning to progressively extract features from input data. For example, lower layers can be configured to identify edges in an image; and higher layers can be configured to identify, based on the edges detected using the lower layers, items captured in the image, such as faces, objects, events, etc. Deep learning can be implemented via Artificial Neural Networks (ANNs), such as deep neural networks, deep belief networks, recurrent neural networks, and/or convolutional neural networks.

Deep learning has been applied to many application fields, such as computer vision, speech/audio recognition, natural language processing, machine translation, bioinformatics, drug design, medical image processing, games, etc.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
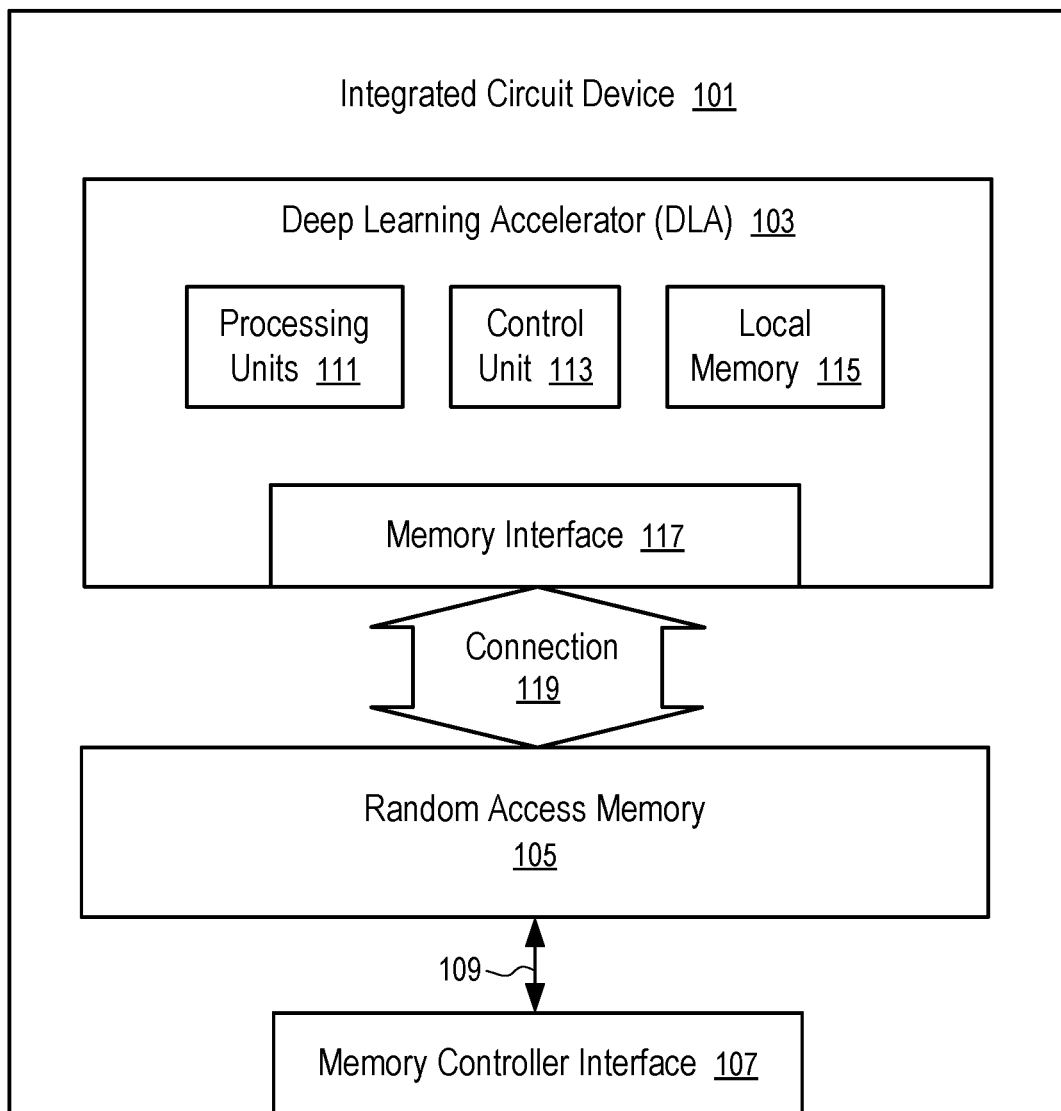
FIG. 1 shows an integrated circuit device having a Deep Learning Accelerator and random access memory configured according to one embodiment.

At least some embodiments disclosed herein provide intelligent low power modes for an integrated circuit configured to perform computations of Artificial Neural Networks (ANNs) with reduced energy consumption and computation time. The integrated circuit includes a Deep Learning Accelerator (DLA) and random access memory. Different banks or groups of memory cells in the integrated circuit stack can be placed in a low power mode independent of other memory banks or groups. A memory bank or group can have multiple low power modes having different levels of energy consumption. It may take different amounts of time for a memory bank or group to transition from different low power modes to the normal operation mode. The integrated circuit is configured to arrange data in the memory banks/groups according to predicted timing of the data being used. Memory banks or groups that are predicted to be idling for periods of time longer than the periods to transition back to the normal mode can be placed in low power modes to reduce power consumption. When the predicted time of use of a memory bank or group is close to the amount of time to transition from the low power mode to the normal mode, the memory bank or group is instructed to initiate the transition to avoid performance degradation.

The Deep Learning Accelerator (DLA) includes a set of programmable hardware computing logic that is specialized and/or optimized to perform parallel vector and/or matrix calculations, including but not limited to multiplication and accumulation of vectors and/or matrices.

Further, the Deep Learning Accelerator (DLA) can include one or more Arithmetic-Logic Units (ALUs) to perform arithmetic and bitwise operations on integer binary numbers.

The Deep Learning Accelerator (DLA) is programmable via a set of instructions to perform the computations of an Artificial Neural Network (ANN).

The granularity of the Deep Learning Accelerator (DLA) operating on vectors and matrices corresponds to the largest unit of vectors/matrices that can be operated upon during the execution of one instruction by the Deep Learning Accelerator (DLA). During the execution of the instruction for a predefined operation on vector/matrix operands, elements of vector/matrix operands can be operated upon by the Deep Learning Accelerator (DLA) in parallel to reduce execution time and/or energy consumption associated with memory/data access. The operations on vector/matrix operands of the granularity of the Deep Learning Accelerator (DLA) can be used as building blocks to implement computations on vectors/matrices of larger sizes.

The implementation of a typical/practical Artificial Neural Network (ANN) involves vector/matrix operands having sizes that are larger than the operation granularity of the Deep Learning Accelerator (DLA). To implement such an Artificial Neural Network (ANN) using the Deep Learning Accelerator (DLA), computations involving the vector/matrix operands of large sizes can be broken down to the computations of vector/matrix operands of the granularity of the Deep Learning Accelerator (DLA). The Deep Learning Accelerator (DLA) can be programmed via instructions to carry out the computations involving large vector/matrix operands. For example, atomic computation capabilities of the Deep Learning Accelerator (DLA) in manipulating vectors and matrices of the granularity of the Deep Learning Accelerator (DLA) in response to instructions can be programmed to implement computations in an Artificial Neural Network (ANN).

In some implementations, the Deep Learning Accelerator (DLA) lacks some of the logic operation capabilities of a typical Central Processing Unit (CPU). However, the Deep Learning Accelerator (DLA) can be configured with sufficient logic units to process the input data provided to an Artificial Neural Network (ANN) and generate the output of the Artificial Neural Network (ANN) according to a set of instructions generated for the Deep Learning Accelerator (DLA). Thus, the Deep Learning Accelerator (DLA) can perform the computation of an Artificial Neural Network (ANN) with little or no help from a Central Processing Unit (CPU) or another processor. Optionally, a conventional general purpose processor can also be configured as part of the Deep Learning Accelerator (DLA) to perform operations that cannot be implemented efficiently using the vector/matrix processing units of the Deep Learning Accelerator (DLA), and/or that cannot be performed by the vector/matrix processing units of the Deep Learning Accelerator (DLA).

A typical Artificial Neural Network (ANN) can be described/specified in a standard format (e.g., Open Neural Network Exchange (ONNX)). A compiler can be used to convert the description of the Artificial Neural Network (ANN) into a set of instructions for the Deep Learning Accelerator (DLA) to perform calculations of the Artificial Neural Network (ANN). The compiler can optimize the set of instructions to improve the performance of the Deep Learning Accelerator (DLA) in implementing the Artificial Neural Network (ANN).

The Deep Learning Accelerator (DLA) can have local memory, such as registers, buffers and/or caches, configured to store vector/matrix operands and the results of vector/matrix operations. Intermediate results in the registers can be pipelined/shifted in the Deep Learning Accelerator (DLA) as operands for subsequent vector/matrix operations to reduce time and energy consumption in accessing memory/data and thus speed up typical patterns of vector/matrix operations in implementing a typical Artificial Neural Network (ANN). The capacity of registers, buffers and/or caches in the Deep Learning Accelerator (DLA) is typically insufficient to hold the entire data set for implementing the computation of a typical Artificial Neural Network (ANN). Thus, a random access memory coupled to the Deep Learning Accelerator (DLA) is configured to provide an improved data storage capability for implementing a typical Artificial Neural Network (ANN). For example, the Deep Learning Accelerator (DLA) loads data and instructions from the random access memory and stores results back into the random access memory.

The communication bandwidth between the Deep Learning Accelerator (DLA) and the random access memory is configured to optimize or maximize the utilization of the computation power of the Deep Learning Accelerator (DLA). For example, high communication bandwidth can be provided between the Deep Learning Accelerator (DLA) and the random access memory such that vector/matrix operands can be loaded from the random access memory into the Deep Learning Accelerator (DLA) and results stored back into the random access memory in a time period that is approximately equal to the time for the Deep Learning Accelerator (DLA) to perform the computations on the vector/matrix operands. The granularity of the Deep Learning Accelerator (DLA) can be configured to increase the ratio between the amount of computations performed by the Deep Learning Accelerator (DLA) and the size of the vector/matrix operands such that the data access traffic between the Deep Learning Accelerator (DLA) and the random access memory can be reduced, which can reduce the requirement on the communication bandwidth between the Deep Learning Accelerator (DLA) and the random access memory. Thus, the bottleneck in data/memory access can be reduced or eliminated.

The typical memory and data usage in the computation of the Artificial Neural Network (ANN) and/or an application that uses the computation results of the Artificial Neural Network (ANN) can have a pattern in timing. Such a pattern can be determined or estimated by a compiler of the Artificial Neural Network (ANN). Alternatively, or in combination, the pattern can be detected and/or recognized via a portion of the Artificial Neural Network (ANN) trained using a machine learning technique. Based on such a pattern, data relevant to the computation of the Artificial Neural Network (ANN) can be arranged in different memory banks or groups based on their timing of use. Before the use of the data in a memory group, the memory group can enter a low power mode and return to the normal mode just before the memory group is about to be used. Thus, the power consumption of the random access memory can be reduced without performance impact.

For example, when the Deep Learning Accelerator (DLA) is busy processing one part of the Artificial Neural Network (ANN), memory banks or groups that are not involved in the computation can enter a low power mode based on an estimate of time to the activities in the corresponding memory banks or groups.

For example, when the progress of ANN computation reaches a stage where the time of the computation to reach a memory bank is within a threshold, the memory bank can enter an alternative low power mode that can transition to the normal mode within a time period shorter than the time threshold.

In some implementations, a memory bank or group can be powered off for a period of time without losing data stored in the memory bank or group. For example, a volatile memory cell (e.g., Dynamic Random-Access Memory (DRAM)) can be powered off for a short period of time and powered on again to refresh its data without data loss or corruption. For example, when the memory bank is not currently storing useful data, the memory bank can be powered off until data is expected to be written into the memory bank.

In other implementations, a memory bank or group can be powered using a reduced voltage to reduce power consumption. Different low power modes can be implemented using different reduced voltages.

Thus, some memory banks or groups controlled by the Deep Learning Accelerator (DLA) can be selectively placed in one or more low power modes, including powering off, according to the predictions of the timings of ANN computations reaching the memory banks or groups. Further, data items can be dynamically re-distributed to the memory banks, during the execution of instructions to perform the ANN computation, according to their predicted time of use to allow more memory banks or groups to enter low power modes and/or for longer periods of time.

FIG. 1 shows an integrated circuit device (101) having a Deep Learning Accelerator (103) and random access memory (105) configured according to one embodiment.

The Deep Learning Accelerator (103) in FIG. 1 includes processing units (111), a control unit (113), and local memory (115). When vector and matrix operands are in the local memory (115), the control unit (113) can use the processing units (111) to perform vector and matrix operations in accordance with instructions. Further, the control unit (113) can load instructions and operands from the random access memory (105) through a memory interface (117) and a high speed/bandwidth connection (119).

The integrated circuit device (101) is configured to be enclosed within an integrated circuit package with pins or contacts for a memory controller interface (107).

The memory controller interface (107) is configured to support a standard memory access protocol such that the integrated circuit device (101) appears to a typical memory controller in a way same as a conventional random access memory device having no Deep Learning Accelerator (DLA) (103). For example, a memory controller external to the integrated circuit device (101) can access, using a standard memory access protocol through the memory controller interface (107), the random access memory (105) in the integrated circuit device (101).

The integrated circuit device (101) is configured with a high bandwidth connection (119) between the random access memory (105) and the Deep Learning Accelerator (DLA) (103) that are enclosed within the integrated circuit device (101). The bandwidth of the connection (119) is higher than the bandwidth of the connection (109) between the random access memory (105) and the memory controller interface (107).

In one embodiment, both the memory controller interface (107) and the memory interface (117) are configured to access the random access memory (105) via a same set of buses or wires. Thus, the bandwidth to access the random access memory (105) is shared between the memory interface (117) and the memory controller interface (107). Alternatively, the memory controller interface (107) and the memory interface (117) are configured to access the random access memory (105) via separate sets of buses or wires. Optionally, the random access memory (105) can include multiple sections that can be accessed concurrently via the connection (119). For example, when the memory interface (117) is accessing a section of the random access memory (105), the memory controller interface (107) can concurrently access another section of the random access memory (105). For example, the different sections can be configured on different integrated circuit dies and/or different planes/banks of memory cells; and the different sections can be accessed in parallel to increase throughput in accessing the random access memory (105). For example, the memory controller interface (107) is configured to access one data unit of a predetermined size at a time; and the memory interface (117) is configured to access multiple data units, each of the same predetermined size, at a time.

In one embodiment, the random access memory (105) and the integrated circuit device (101) are configured on different integrated circuit dies configured within a same integrated circuit package. Further, the random access memory (105) can be configured on one or more integrated circuit dies that allows parallel access of multiple data elements concurrently.

In some implementations, the number of data elements of a vector or matrix that can be accessed in parallel over the connection (119) corresponds to the granularity of the Deep Learning Accelerator (DLA) operating on vectors or matrices. For example, when the processing units (111) can operate on a number of vector/matrix elements in parallel, the connection (119) is configured to load or store the same number, or multiples of the number, of elements via the connection (119) in parallel.

Optionally, the data access speed of the connection (119) can be configured based on the processing speed of the Deep Learning Accelerator (DLA) (103). For example, after an amount of data and instructions have been loaded into the local memory (115), the control unit (113) can execute an instruction to operate on the data using the processing units (111) to generate output. Within the time period of processing to generate the output, the access bandwidth of the connection (119) allows the same amount of data and instructions to be loaded into the local memory (115) for the next operation and the same amount of output to be stored back to the random access memory (105). For example, while the control unit (113) is using a portion of the local memory (115) to process data and generate output, the memory interface (117) can offload the output of a prior operation into the random access memory (105) from, and load operand data and instructions into, another portion of the local memory (115). Thus, the utilization and performance of the Deep Learning Accelerator (DLA) are not restricted or reduced by the bandwidth of the connection (119).

The random access memory (105) can be used to store the model data of an Artificial Neural Network (ANN) and to buffer input data for the Artificial Neural Network (ANN). The model data does not change frequently. The model data can include the output generated by a compiler for the Deep Learning Accelerator (DLA) to implement the Artificial Neural Network (ANN). The model data typically includes matrices used in the description of the Artificial Neural Network (ANN) and instructions generated for the Deep Learning Accelerator (DLA) (103) to perform vector/matrix operations of the Artificial Neural Network (ANN) based on vector/matrix operations of the granularity of the Deep Learning Accelerator (DLA) (103). The instructions operate not only on the vector/matrix operations of the Artificial Neural Network (ANN), but also on the input data for the Artificial Neural Network (ANN).

In one embodiment, when the input data is loaded or updated in the random access memory (105), the control unit (113) of the Deep Learning Accelerator (DLA) (103) can automatically execute the instructions for the Artificial Neural Network (ANN) to generate an output of the Artificial Neural Network (ANN). The output is stored into a pre-defined region in the random access memory (105). The Deep Learning Accelerator (DLA) (103) can execute the instructions without help from a Central Processing Unit (CPU). Thus, communications for the coordination between the Deep Learning Accelerator (DLA) (103) and a processor outside of the integrated circuit device (101) (e.g., a Central Processing Unit (CPU)) can be reduced or eliminated.

Optionally, the logic circuit of the Deep Learning Accelerator (DLA) (103) can be implemented via Complementary Metal Oxide Semiconductor (CMOS). For example, the technique of CMOS Under the Array (CUA) of memory cells of the random access memory (105) can be used to implement the logic circuit of the Deep Learning Accelerator (DLA) (103), including the processing units (111) and the control unit (113). Alternatively, the technique of CMOS in the Array of memory cells of the random access memory (105) can be used to implement the logic circuit of the Deep Learning Accelerator (DLA) (103).

In some implementations, the Deep Learning Accelerator (DLA) (103) and the random access memory (105) can be implemented on separate integrated circuit dies and connected using Through-Silicon Vias (TSV) for increased data bandwidth between the Deep Learning Accelerator (DLA) (103) and the random access memory (105). For example, the Deep Learning Accelerator (DLA) (103) can be formed on an integrated circuit die of a Field-Programmable Gate Array (FPGA) or Application Specific Integrated circuit (ASIC).

Alternatively, the Deep Learning Accelerator (DLA) (103) and the random access memory (105) can be configured in separate integrated circuit packages and connected via multiple point-to-point connections on a printed circuit board (PCB) for parallel communications and thus increased data transfer bandwidth.

The random access memory (105) can be volatile memory or non-volatile memory, or a combination of volatile memory and non-volatile memory. Examples of non-volatile memory include flash memory, memory cells formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two lays of wires running in perpendicular directions, where wires of one lay run in one direction in the layer that is located above the memory element columns, and wires of the other lay run in another direction and are located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

For example, non-volatile memory can be configured to implement at least a portion of the random access memory (105). The non-volatile memory in the random access memory (105) can be used to store the model data of an Artificial Neural Network (ANN). Thus, after the integrated circuit device (101) is powered off and restarts, it is not necessary to reload the model data of the Artificial Neural Network (ANN) into the integrated circuit device (101). Further, the non-volatile memory can be programmable/rewritable. Thus, the model data of the Artificial Neural Network (ANN) in the integrated circuit device (101) can be updated or replaced to implement an update Artificial Neural Network (ANN), or another Artificial Neural Network (ANN).

The processing units (111) of the Deep Learning Accelerator (DLA) (103) can include vector-vector units, matrix-vector units, and/or matrix-matrix units. Examples of units configured to perform for vector-vector operations, matrix-vector operations, and matrix-matrix operations are discussed below in connection with FIGS. 2-4.

Figure 2:
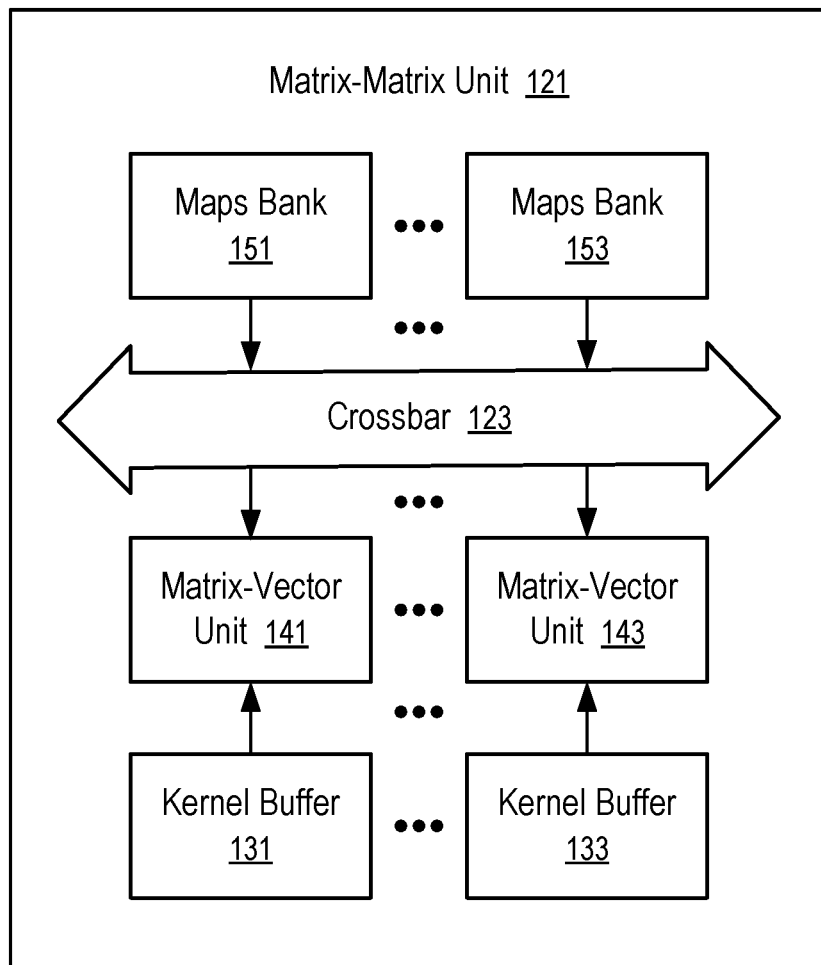
FIG. 2 shows a processing unit configured to perform matrix-matrix operations according to one embodiment.

FIG. 2 shows a processing unit configured to perform matrix-matrix operations according to one embodiment. For example, the matrix-matrix unit (121) of FIG. 2 can be used as one of the processing units (111) of the Deep Learning Accelerator (DLA) (103) of FIG. 1.

In FIG. 2, the matrix-matrix unit (121) includes multiple kernel buffers (131 to 133) and multiple the maps banks (151 to 153). Each of the maps banks (151 to 153) stores one vector of a matrix operand that has multiple vectors stored in the maps banks (151 to 153) respectively; and each of the kernel buffers (131 to 133) stores one vector of another matrix operand that has multiple vectors stored in the kernel buffers (131 to 133) respectively. The matrix-matrix unit (121) is configured to perform multiplication and accumulation operations on the elements of the two matrix operands, using multiple matrix-vector units (141 to 143) that operate in parallel.

A crossbar (123) connects the maps banks (151 to 153) to the matrix-vector units (141 to 143). The same matrix operand stored in the maps bank (151 to 153) is provided via the crossbar (123) to each of the matrix-vector units (141 to 143); and the matrix-vector units (141 to 143) receives data elements from the maps banks (151 to 153) in parallel. Each of the kernel buffers (131 to 133) is connected to a respective one in the matrix-vector units (141 to 143) and provides a vector operand to the respective matrix-vector unit. The matrix-vector units (141 to 143) operate concurrently to compute the operation of the same matrix operand, stored in the maps banks (151 to 153) multiplied by the corresponding vectors stored in the kernel buffers (131 to 133). For example, the matrix-vector unit (141) performs the multiplication operation on the matrix operand stored in the maps banks (151 to 153) and the vector operand stored in the kernel buffer (131), while the matrix-vector unit (143) is concurrently performing the multiplication operation on the matrix operand stored in the maps banks (151 to 153) and the vector operand stored in the kernel buffer (133).

Figure 3:
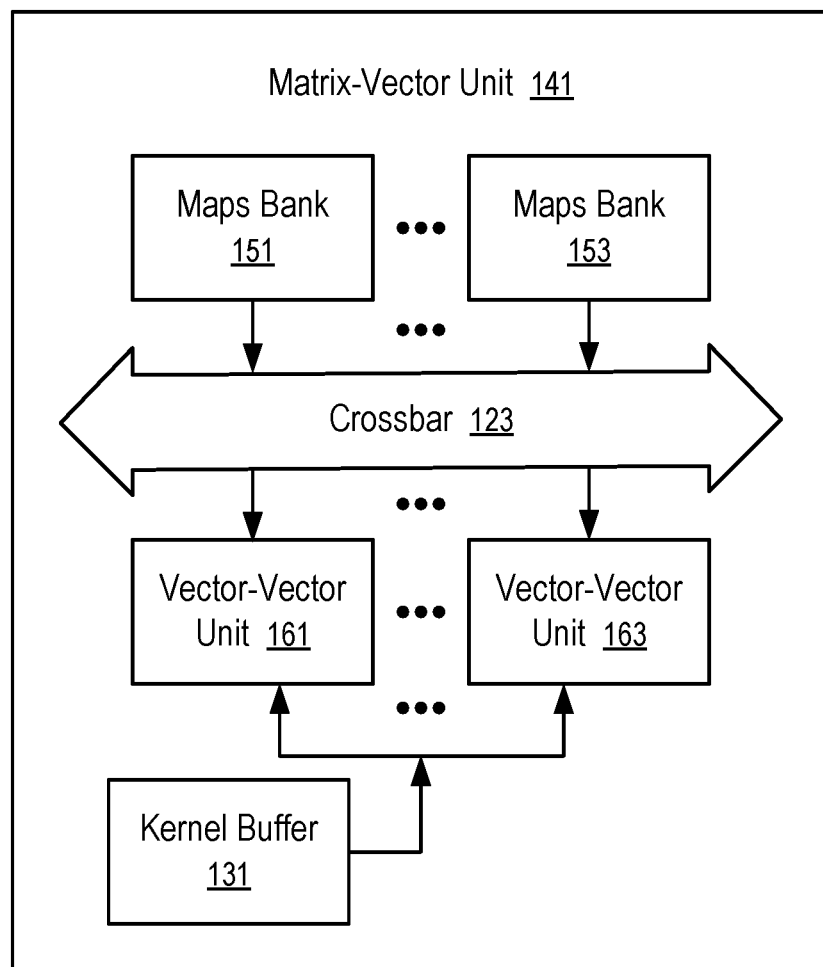
FIG. 3 shows a processing unit configured to perform matrix-vector operations according to one embodiment.

Each of the matrix-vector units (141 to 143) in FIG. 2 can be implemented in a way as illustrated in FIG. 3.

FIG. 3 shows a processing unit configured to perform matrix-vector operations according to one embodiment. For example, the matrix-vector unit (141) of FIG. 3 can be used as any of the matrix-vector units in the matrix-matrix unit (121) of FIG. 2.

In FIG. 3, each of the maps banks (151 to 153) stores one vector of a matrix operand that has multiple vectors stored in the maps banks (151 to 153) respectively, in a way similar to the maps banks (151 to 153) of FIG. 2. The crossbar (123) in FIG. 3 provides the vectors from the maps banks (151) to the vector-vector units (161 to 163) respectively. A same vector stored in the kernel buffer (131) is provided to the vector-vector units (161 to 163).

The vector-vector units (161 to 163) operate concurrently to compute the operation of the corresponding vector operands, stored in the maps banks (151 to 153) respectively, multiplied by the same vector operand that is stored in the kernel buffer (131). For example, the vector-vector unit (161) performs the multiplication operation on the vector operand stored in the maps bank (151) and the vector operand stored in the kernel buffer (131), while the vector-vector unit (163) is concurrently performing the multiplication operation on the vector operand stored in the maps bank (153) and the vector operand stored in the kernel buffer (131).

When the matrix-vector unit (141) of FIG. 3 is implemented in a matrix-matrix unit (121) of FIG. 2, the matrix-vector unit (141) can use the maps banks (151 to 153), the crossbar (123) and the kernel buffer (131) of the matrix-matrix unit (121).

Figure 4:
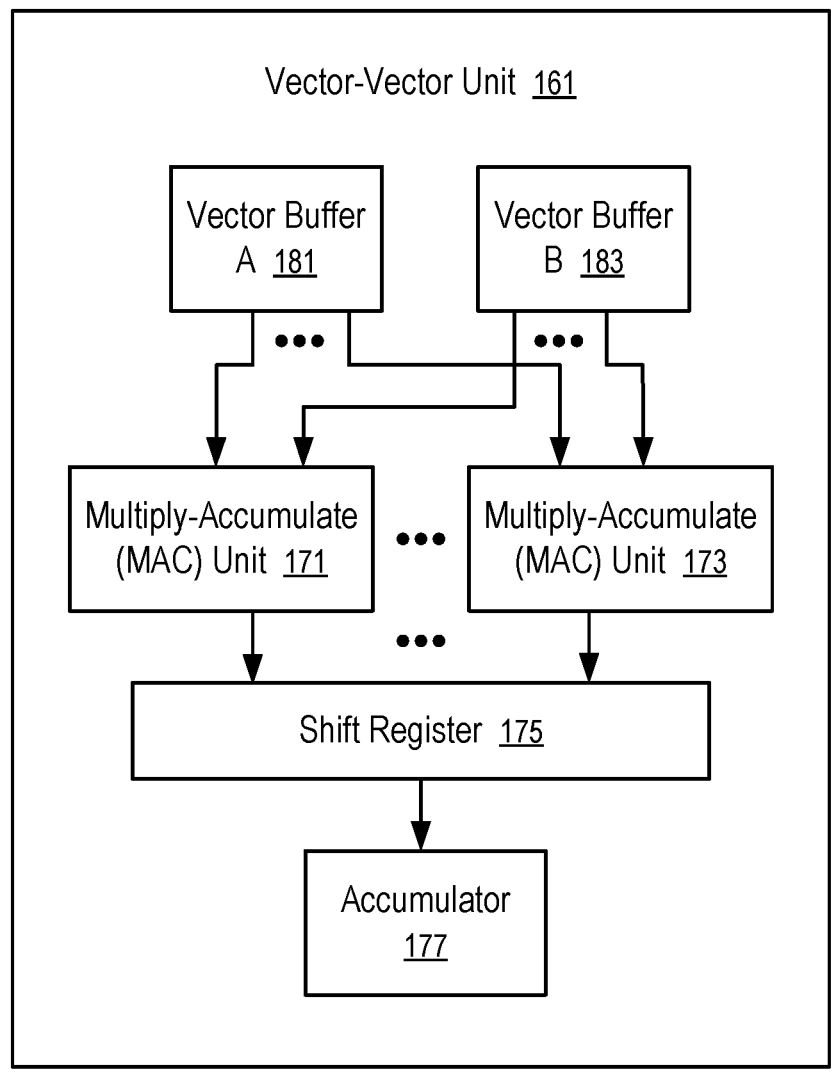
FIG. 4 shows a processing unit configured to perform vector-vector operations according to one embodiment.

Each of the vector-vector units (161 to 163) in FIG. 3 can be implemented in a way as illustrated in FIG. 4.

FIG. 4 shows a processing unit configured to perform vector-vector operations according to one embodiment. For example, the vector-vector unit (161) of FIG. 4 can be used as any of the vector-vector units in the matrix-vector unit (141) of FIG. 3.

In FIG. 4, the vector-vector unit (161) has multiple multiply-accumulate units (171 to 173). Each of the multiply-accumulate units (e.g., 173 or 171) can receive two numbers as operands, perform multiplication of the two numbers, and add the result of the multiplication to a sum maintained in the multiply-accumulate (MAC) unit.

Each of the vector buffers (181 and 183) stores a list of numbers. A pair of numbers, each from one of the vector buffers (181 and 183), can be provided to each of the multiply-accumulate units (171 to 173) as input. The multiply-accumulate units (171 to 173) can receive multiple pairs of numbers from the vector buffers (181 and 183) in parallel and perform the multiply-accumulate (MAC) operations in parallel. The outputs from the multiply-accumulate units (171 to 173) are stored into the shift register (175); and an accumulator (177) computes the sum of the results in the shift register (175).

When the vector-vector unit (161) of FIG. 4 is implemented in a matrix-vector unit (141) of FIG. 3, the vector-vector unit (161) can use a maps bank (e.g., 151 or 153) as one vector buffer (181), and the kernel buffer (131) of the matrix-vector unit (141) as another vector buffer (183).

The vector buffers (181 and 183) can have a same length to store the same number/count of data elements. The length can be equal to, or the multiple of, the count of multiply-accumulate units (171 to 173) in the vector-vector unit (161). When the length of the vector buffers (181 and 183) is the multiple of the count of multiply-accumulate units (171 to 173), a number of pairs of inputs, equal to the count of the multiply-accumulate units (171 to 173), can be provided from the vector buffers (181 and 183) as inputs to the multiply-accumulate units (171 to 173) in each iteration; and the vector buffers (181 and 183) feed their elements into the multiply-accumulate units (171 to 173) through multiple iterations.

In one embodiment, the communication bandwidth of the connection (119) between the Deep Learning Accelerator (DLA) (103) and the random access memory (105) is sufficient for the matrix-matrix unit (121) to use portions of the random access memory (105) as the maps banks (151 to 153) and the kernel buffers (131 to 133).

In another embodiment, the maps banks (151 to 153) and the kernel buffers (131 to 133) are implemented in a portion of the local memory (115) of the Deep Learning Accelerator (DLA) (103). The communication bandwidth of the connection (119) between the Deep Learning Accelerator (DLA) (103) and the random access memory (105) is sufficient to load, into another portion of the local memory (115), matrix operands of the next operation cycle of the matrix-matrix unit (121), while the matrix-matrix unit (121) is performing the computation in the current operation cycle using the maps banks (151 to 153) and the kernel buffers (131 to 133) implemented in a different portion of the local memory (115) of the Deep Learning Accelerator (DLA) (103).

Figure 5:
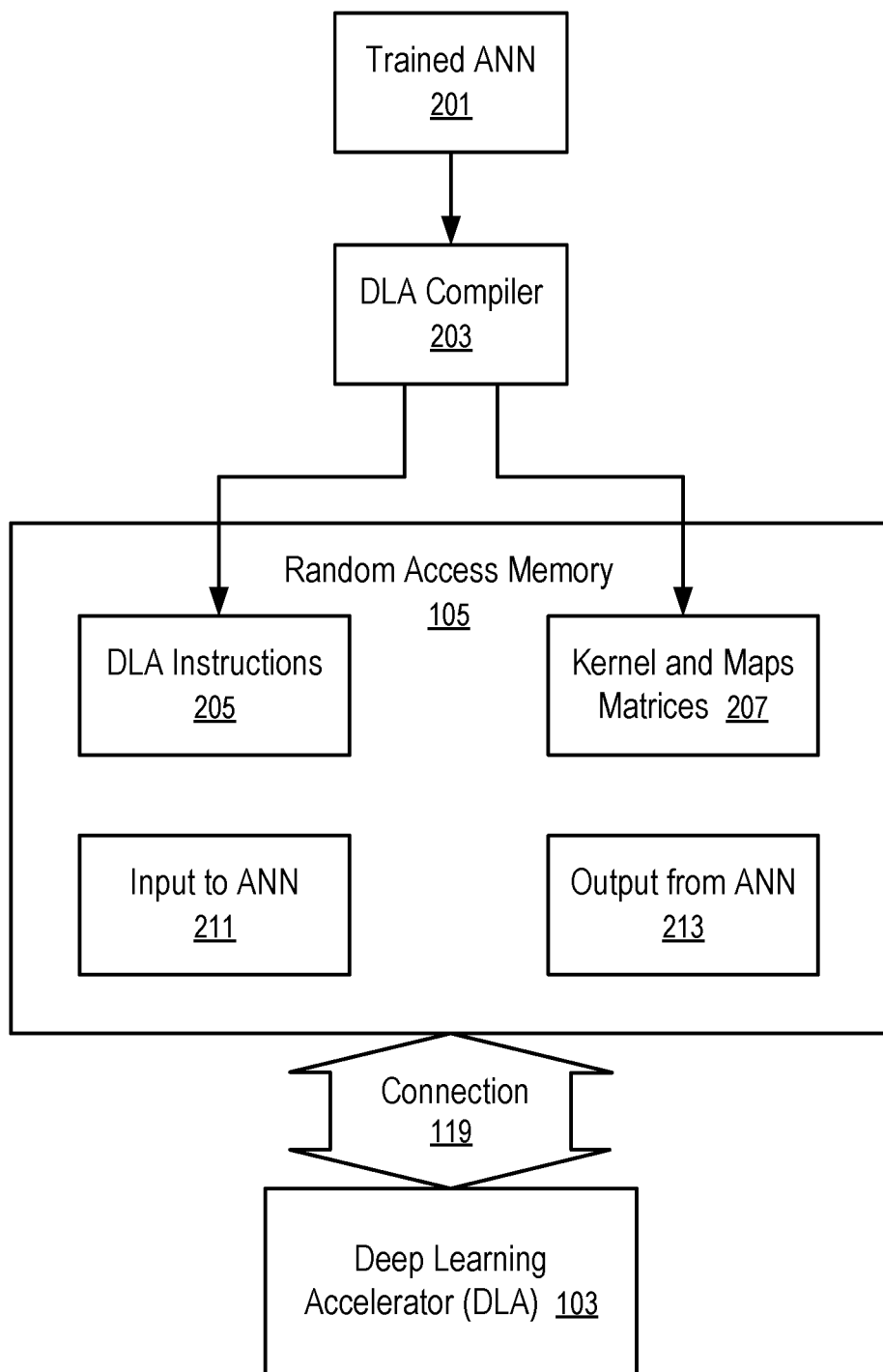
FIG. 5 shows a Deep Learning Accelerator and random access memory configured to autonomously apply inputs to a trained Artificial Neural Network according to one embodiment.

FIG. 5 shows a Deep Learning Accelerator and random access memory configured to autonomously apply inputs to a trained Artificial Neural Network according to one embodiment.

An Artificial Neural Network (ANN) (201) that has been trained through machine learning (e.g., deep learning) can be described in a standard format (e.g., Open Neural Network Exchange (ONNX)). The description of the trained Artificial Neural Network (ANN) (201) in the standard format identifies the properties of the artificial neurons and their connectivity.

In FIG. 5, a Deep Learning Accelerator (DLA) compiler (203) converts trained Artificial Neural Network (ANN) (201) by generating instructions (205) for a Deep Learning Accelerator (DLA) (103) and matrices (207) corresponding to the properties of the artificial neurons and their connectivity. The instructions (205) and the matrices (207) generated by the DLA compiler (203) from the trained Artificial Neural Network (ANN) (201) can be stored in random access memory (105) for the Deep Learning Accelerator (DLA) (103).

For example, the random access memory (105) and the Deep Learning Accelerator (DLA) (103) can be connected via a high bandwidth connection (119) in a way as in the integrated circuit device (101) of FIG. 1. The autonomous computation of FIG. 5 based on the instructions (205) and the matrices (207) can be implemented in the integrated circuit device (101) of FIG. 1. Alternatively, the random access memory (105) and the Deep Learning Accelerator (DLA) (103) can be configured on a printed circuit board with multiple point to point serial buses running in parallel to implement the connection (119).

In FIG. 5, after the results of the DLA compiler (203) are stored in the random access memory (105), the application of the trained Artificial Neural Network (ANN) (201) to process an input (211) to the trained Artificial Neural Network (ANN) (201) to generate the corresponding output (213) of the trained Artificial Neural Network (ANN) (201) can be triggered by the presence of the input (211) in the random access memory (105), or another indication provided in the random access memory (105).

In response, the Deep Learning Accelerator (DLA) (103) executes the instructions (205) to combine the input (211) and the matrices (207). The execution of the instructions (205) can include the generation of maps matrices for the maps banks (151 to 153) of one or more matrix-matrix units (e.g., 121) of the Deep Learning Accelerator (DLA) (103).

In some embodiments, the inputs to Artificial Neural Network (ANN) (201) is in the form of an initial maps matrix. Portions of the initial maps matrix can be retrieved from the random access memory (105) as the matrix operand stored in the maps banks (151 to 153) of a matrix-matrix unit (121). Alternatively, the DLA instructions (205) also include instructions for the Deep Learning Accelerator (DLA) (103) to generate the initial maps matrix from the input (211).

According to the DLA instructions (205), the Deep Learning Accelerator (DLA) (103) loads matrix operands into the kernel buffers (131 to 133) and maps banks (151 to 153) of its matrix-matrix unit (121). The matrix-matrix unit (121) performs the matrix computation on the matrix operands. For example, the DLA instructions (205) break down matrix computations of the trained Artificial Neural Network (ANN) (201) according to the computation granularity of the Deep Learning Accelerator (DLA) (103) (e.g., the sizes/dimensions of matrices that loaded as matrix operands in the matrix-matrix unit (121)) and applies the input feature maps to the kernel of a layer of artificial neurons to generate output as the input for the next layer of artificial neurons.

Upon completion of the computation of the trained Artificial Neural Network (ANN) (201) performed according to the instructions (205), the Deep Learning Accelerator (DLA) (103) stores the output (213) of the Artificial Neural Network (ANN) (201) at a pre-defined location in the random access memory (105), or at a location specified in an indication provided in the random access memory (105) to trigger the computation.

When the technique of FIG. 5 is implemented in the integrated circuit device (101) of FIG. 1, an external device connected to the memory controller interface (107) can write the input (211) into the random access memory (105) and trigger the autonomous computation of applying the input (211) to the trained Artificial Neural Network (ANN) (201) by the Deep Learning Accelerator (DLA) (103). After a period of time, the output (213) is available in the random access memory (105); and the external device can read the output (213) via the memory controller interface (107) of the integrated circuit device (101).

For example, a predefined location in the random access memory (105) can be configured to store an indication to trigger the autonomous execution of the instructions (205) by the Deep Learning Accelerator (DLA) (103). The indication can optionally include a location of the input (211) within the random access memory (105). Thus, during the autonomous execution of the instructions (205) to process the input (211), the external device can retrieve the output generated during a previous run of the instructions (205), and/or store another set of input for the next run of the instructions (205).

Optionally, a further predefined location in the random access memory (105) can be configured to store an indication of the progress status of the current run of the instructions (205). Further, the indication can include a prediction of the completion time of the current run of the instructions (205) (e.g., estimated based on a prior run of the instructions (205)). Thus, the external device can check the completion status at a suitable time window to retrieve the output (213).

In some embodiments, the random access memory (105) is configured with sufficient capacity to store multiple sets of inputs (e.g., 211) and outputs (e.g., 213). Each set can be configured in a predetermined slot/area in the random access memory (105).

The Deep Learning Accelerator (DLA) (103) can execute the instructions (205) autonomously to generate the output (213) from the input (211) according to matrices (207) stored in the random access memory (105) without helps from a processor or device that is located outside of the integrated circuit device (101).

In a method according to one embodiment, random access memory (105) of a computing device (e.g., 101) can be accessed using an interface (107) of the computing device (e.g., 101) to a memory controller. The computing device (e.g., 101) can have processing units (e.g., 111) configured to perform at least computations on matrix operands, such as a matrix operand stored in maps banks (151 to 153) and a matrix operand stored in kernel buffers (131 to 133).

For example, the computing device (e.g., 101) can be enclosed within an integrated circuit package; and a set of connections can connect the interface (107) to the memory controller that is located outside of the integrated circuit package.

Instructions (205) executable by the processing units (e.g., 111) can be written into the random access memory (105) through the interface (107).

Matrices (207) of an Artificial Neural Network (201) can be written into the random access memory (105) through the interface (107). The matrices (207) identify the property and/or state of the Artificial Neural Network (201).

Optionally, at least a portion of the random access memory (105) is non-volatile and configured to store the instructions (205) and the matrices (07) of the Artificial Neural Network (201).

First input (211) to the Artificial Neural Network can be written into the random access memory (105) through the interface (107).

An indication is provided in the random access memory (105) to cause the processing units (111) to start execution of the instructions (205). In response to the indication, the processing units (111) execute the instructions to combine the first input (211) with the matrices (207) of the Artificial Neural Network (201) to generate first output (213) from the Artificial Neural Network (201) and store the first output (213) in the random access memory (105).

For example, the indication can be an address of the first input (211) in the random access memory (105); and the indication can be stored a predetermined location in the random access memory (105) to cause the initiation of the execution of the instructions (205) for the input (211) identified by the address. Optionally, the indication can also include an address for storing the output (213).

The first output (213) can be read, through the interface (107), from the random access memory (105).

For example, the computing device (e.g., 101) can have a Deep Learning Accelerator (103) formed on a first integrated circuit die and the random access memory (105) formed on one or more second integrated circuit dies. The connection (119) between the first integrated circuit die and the one or more second integrated circuit dies can include Through-Silicon Vias (TSVs) to provide high bandwidth for memory access.

For example, a description of the Artificial Neural Network (201) can be converted using a compiler (203) into the instructions (205) and the matrices (207). The combination of the instructions (205) and the matrices (207) stored in the random access memory (105) and the Deep Learning Accelerator (103) provides an autonomous implementation of the Artificial Neural Network (201) that can automatically convert input (211) to the Artificial Neural Network (201) to its output (213).

For example, during a time period in which the Deep Learning Accelerator (103) executes the instructions (205) to generate the first output (213) from the first input (211)

according to the matrices (207) of the Artificial Neural Network (201), the second input to Artificial Neural Network (201) can be written into the random access memory (105) through the interface (107) at an alternative location. After the first output (213) is stored in the random access memory (105), an indication can be provided in the random access memory to cause the Deep Learning Accelerator (103) to again start the execution of the instructions and generate second output from the second input.

During the time period in which the Deep Learning Accelerator (103) executes the instructions (205) to generate the second output from the second input according to the matrices (207) of the Artificial Neural Network (201), the first output (213) can be read from the random access memory (105) through the interface (107); and a further input can be written into the random access memory to replace the first input (211), or written at a different location. The process can be repeated for a sequence of inputs.

The Deep Learning Accelerator (103) can include at least one matrix-matrix unit (121) that can execute an instruction on two matrix operands. The two matrix operands can be a first matrix and a second matrix. Each of two matrices has a plurality of vectors. The matrix-matrix unit (121) can include a plurality of matrix-vector units (141 to 143) configured to operate in parallel. Each of the matrix-vector units (141 to 143) are configured to operate, in parallel with other matrix-vector units, on the first matrix and one vector from second matrix. Further, each of the matrix-vector units (141 to 143) can have a plurality of vector-vector units (161 to 163) configured to operate in parallel. Each of the vector-vector units (161 to 163) is configured to operate, in parallel with other vector-vector units, on a vector from the first matrix and a common vector operand of the corresponding matrix-vector unit. Further, each of the vector-vector units (161 to 163) can have a plurality of multiply-accumulate units (171 to 173) configured to operate in parallel.

The Deep Learning Accelerator (103) can have local memory (115) and a control unit (113) in addition to the processing units (111). The control unit (113) can load instructions (205) and matrix operands (e.g., matrices (207)) from the random access memory (105) for execution by the processing units (111). The local memory can cache matrix operands used by the matrix-matrix unit. The connection (119) can be configured with a bandwidth sufficient to load a set of matrix operands from the random access memory (105) to the local memory (115) during a time period in which the matrix-matrix unit performs operations on two other matrix operands. Further, during the time period, the bandwidth is sufficient to store a result, generated by the matrix-matrix unit (121) in a prior instruction execution, from the local memory (115) to the random access memory (105).

Figure 6:
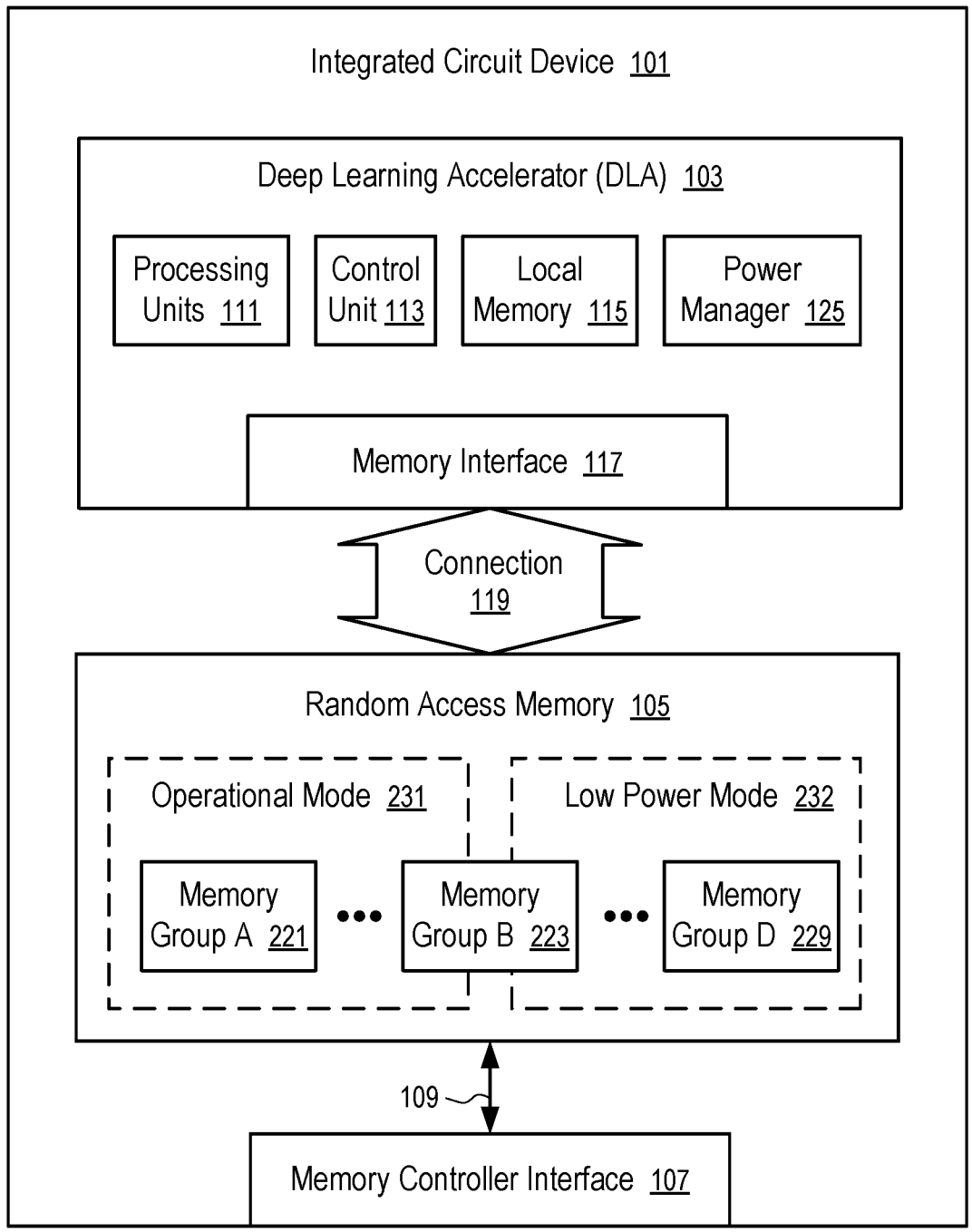
FIGS. 6-7 illustrate integrated circuit devices having a Deep Learning Accelerator and random access memory with low power modes configured according to some embodiments.
Figure 7:
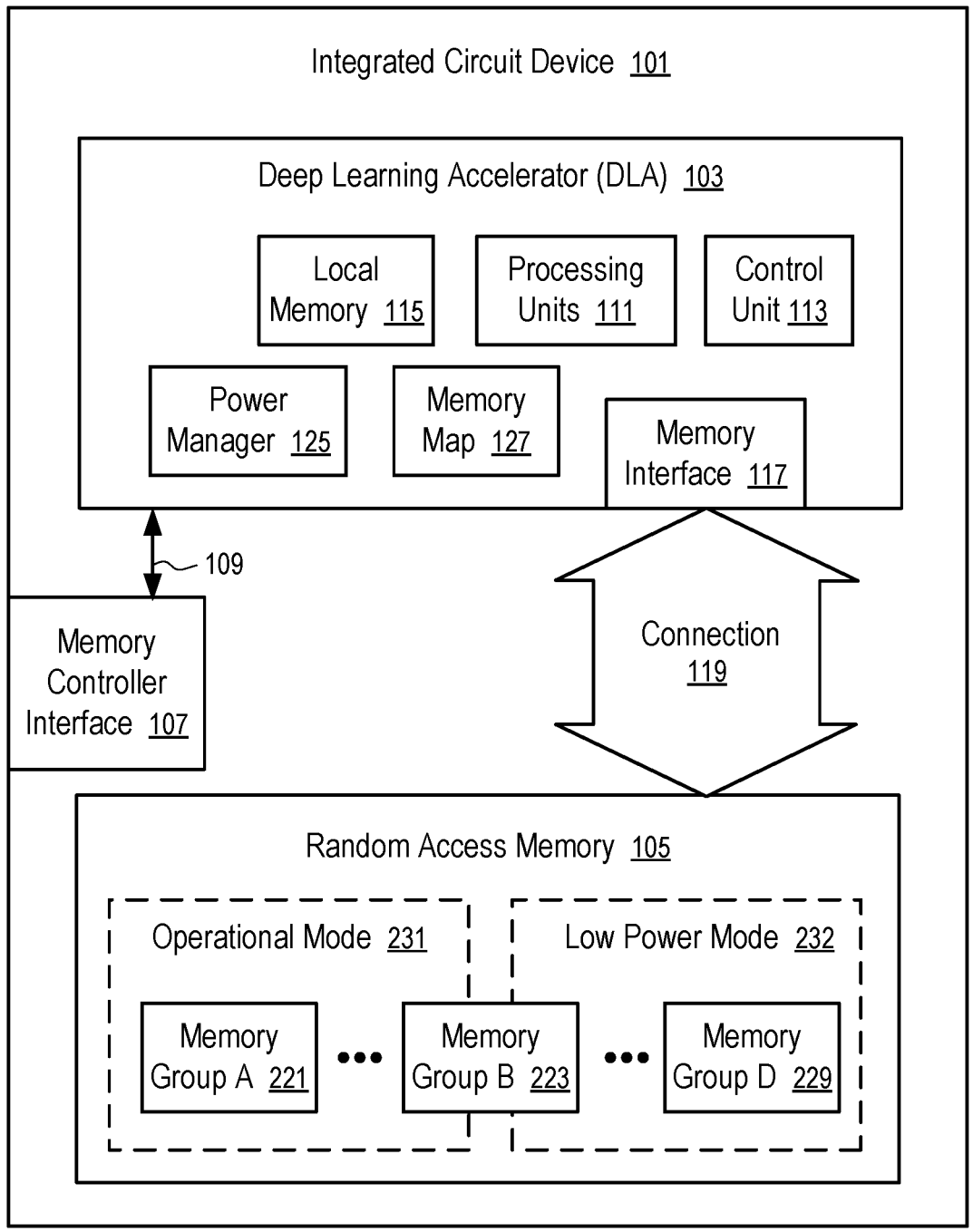

FIGS. 6-7 illustrate integrated circuit devices having a Deep Learning Accelerator and random access memory with low power modes configured according to some embodiments.

In FIG. 6, the random access memory (105) is configured to have multiple memory groups (e.g., 221, 223, . . . , 229). Different memory groups (e.g., 221, 223, . . . , 229) can be in different power modes (e.g., 231 and 231).

The Deep Learning Accelerator (DLA) (103) includes a power manager (125). The power manager (125) is configured to selectively instruct some of the memory groups (e.g., 229) to enter a low power mode (232) to reduce power consumption. The power manager (125) can activate the low power mode (232) for some of the memory groups (e.g., 229) without reducing the computation performance of the Deep Learning Accelerator (DLA) (103) and/or the service performance of the integrated circuit device (101) in a computer system.

For example, in a time window, the Deep Learning Accelerator (DLA) (103) executes a portion of the DLA instructions (205) for implementing the computation of the Artificial Neural Network (ANN) (201). During the execution of the portion of the DLA instructions (205) in the time window, the Deep Learning Accelerator (DLA) (103) uses the memory group (221). Thus, the memory group (221) is an active or normal operational mode (231) of being actively used by the Deep Learning Accelerator (DLA) (103) without performance degradation. At the same time, another memory group (e.g., 229) can be in an idle state. Thus, the Deep Learning Accelerator (DLA) (103) can instruct the idling memory group (229) to enter a low power mode (232).

In general, a memory group (e.g., 229) in the Random Access Memory (RAM) (105) can have one or more low power modes.

For example, one low power mode can periodically power off the memory group (229) to reduce its power consumption without powering off other memory groups (e.g., 221). The power supply to the memory group (229) can be turned off for a short period of time. After the short period of time, the power supply to the memory group (229) can be turned on to refresh the content stored in the memory group (229). The period of time is configured such that the content stored in the memory group (229) can be refreshed in time to prevent data loss. After the data in the memory group (229) is refreshed, the power supply to the memory group (229) can be turn off again for another period of time.

In some instances, the content stored in the memory group (229) can be discarded. Thus, the power supply to the memory group (229) can be turned off until the memory capacity of the memory group (229) is to be used by the Deep Learning Accelerator (DLA) (103).

In some implementations, the memory group (229) in the Random Access Memory (RAM) (105) is non-volatile. Thus, the memory group (229) can be powered off for an extended period of time without losing the data stored in the memory group (229). Thus, the power manager (125) does not have to turn on power supply to the memory group (229) merely for refreshing of the data stored in the memory groups (229).

Optionally, the low power mode (232) can be implemented via reducing the voltages of a power supply to the memory group (229). While the memory group (229) is powered by a reduced voltage, the memory access performance of the memory group (229) is reduced. However, the memory group (229) can still be functional with the reduced voltage. When the reduced performance of the memory group (229) does not reduced the performance of the Deep Learning Accelerator (DLA) (103), the power manager (125) can instruct the Random Access Memory (RAM) (105) to place the memory group (229) in such a low power mode (232).

Optionally, the low power mode (232) can be implemented via reducing a clock frequency used by the memory group (229). While the memory group (229) is operating under a reduced clock frequency, the memory access functionality of the memory group (229) is available, but the performance of the memory group (229) is reduced. When the reduced performance of the memory group (229) does not reduced the performance of the Deep Learning Accelerator (DLA) (103), the power manager (125) can instruct the Random Access Memory (RAM) (105) to place the memory group (229) in such a low power mode (232).

The power manager (125) is configured to adjust the power modes of the memory groups (e.g., 221, 223, . . . , 229) based on the prediction of the usage timing of the memory groups (e.g., 221, 223, . . . , 229). Further, low power modes having functional memory access functionality but at reduced performance level can be used to reorganize the distribution of data/memory addresses to allow more memory groups to be in low power modes and/or for longer period of time for increased performance in power consumption.

The power manager (125) is configured to instruct a memory group (e.g., 223) to transition from a low power mode (232) to the active or normal operational mode (231) according to a predicted usage timing such the transition completes before the memory group (e.g., 223) is used. Thus, the memory group (e.g., 223) is prepared to offer memory access functionality at full performance just in time for its service to the Deep Learning Accelerator (DLA) (103). Such a scheduled transition minimizes or reduces the impact on the computation performance of the Deep Learning Accelerator (DLA) (103).

Based on the predicted timing of use of the memory groups (221, 223, . . . , 229), the power manager (125) can instruct the random access memory (105) to move a memory group (e.g., 223) from one lower power mode to another low power mode and then to the normal operational mode (231).

For example, different low power modes can have different lengths of transition time to the normal operational mode (231). The power manager (125) can move the memory group (e.g., 223) from a low power mode having a longer transition time to another low power mode having a shorter transition time. Such a transition can be made in anticipation of the memory group (e.g., 223) to be used and to increase the reduction in power consumption and to minimize the chances of performance impact.

For example, different low power modes can have different performance levels in memory service. The power manager (125) can move the memory group (e.g., 223) from a low power mode having a lower performance level to another low power mode having a higher performance level. Such a transition can be made to move data into or out of the memory group (e.g., 223) in preparation for its service in the normal operational mode (231).

The Deep Learning Accelerator (DLA) (103) can predict the usage timing of data items stored in the random access memory (105). Based on the predicted data usage timing, the Deep Learning Accelerator (DLA) (103) can move data items among the memory groups (e.g., 221, 223, . . . , 229) to increase the use of low power mode (e.g., 232) and power consumption reduction.

For example, data items can be placed into memory groups (e.g., 221, 223, . . . , 229) based on their time windows of usages. Data items to be used in a first time window are stored in a first memory group (e.g., 221); data items to be used in a second time windows are stored in a second memory group (e.g., 229). During the first time window, the second memory group (e.g., 229) can enter a low power mode (232), while the first memory group (e.g., 221) is in the normal operational mode (231). During the second time window, the first memory group can enter a low power mode (232), while the second memory group is in the normal operational mode (231). Thus, different memory groups can enter the normal operational mode (231) at different phases of the execution of the DLA instructions (205). Similarly, different memory groups can enter the low power mode (232) at different phases of the execution of the DLA instructions (205). A memory group (e.g., 223) can move from one power mode to another power mode one or more times during the execution of the DLA instructions (205).

The power manager (125) can use a memory map (127), as illustrated in FIG. 7, to change data placement in the memory groups (e.g., 221, 223, . . . , 229). The data placement can be adjusted to aggregate data items into memory groups according to their time window and increase the use of low power modes.

For example, the DLA instructions (205) use memory addresses in a predetermined memory space. The timing of the memory access can be tracked in this memory address space to capture the timing patterns relative to the execution progress of the DLA instructions.

The memory map (127) converts the memory addresses used in the DLA instructions (205) to the physical addresses used to access the memory groups (221, 223, . . . , 229) in the Random Access Memory (RAM) (105). The conversion allows a predetermined memory address used in the DLA instructions (205) to be physically in any of the memory groups (221, 223, . . . , 229). When the power manager (125) move data items from one memory group (e.g., 223) to another memory group (e.g., 221), the memory map (127) is updated. Thus, the same data item is accessed using the same address specified in the instructions (205). The updated memory map (127) allows the Deep Learning Accelerator (DLA) (103) to follow the predetermined memory addresses used in the DLA instructions (205) to access the date items that have changing physical addresses in the Random Access Memory (RAM) (105).

In FIG. 7, the memory controller interface (107) is configured to access the Random Access Memory (RAM) (105) using the memory map (127) and the connection (119) between the Deep Learning Accelerator (DLA) (103) and the Random Access Memory (RAM) (105). An external device can use the memory controller interface (107) to access Random Access Memory (RAM) (105). Such an external device can be a host system connected to the memory controller interface (107) through a memory bus. The external device and the DLA instructions access the memory capacity of the Random Access Memory (RAM) (105) in the same predetermined memory space. The memory map (127) converts the memory addresses in the predetermined memory space into the physical memory addresses in Random Access Memory (RAM) (105).

Figure 8:
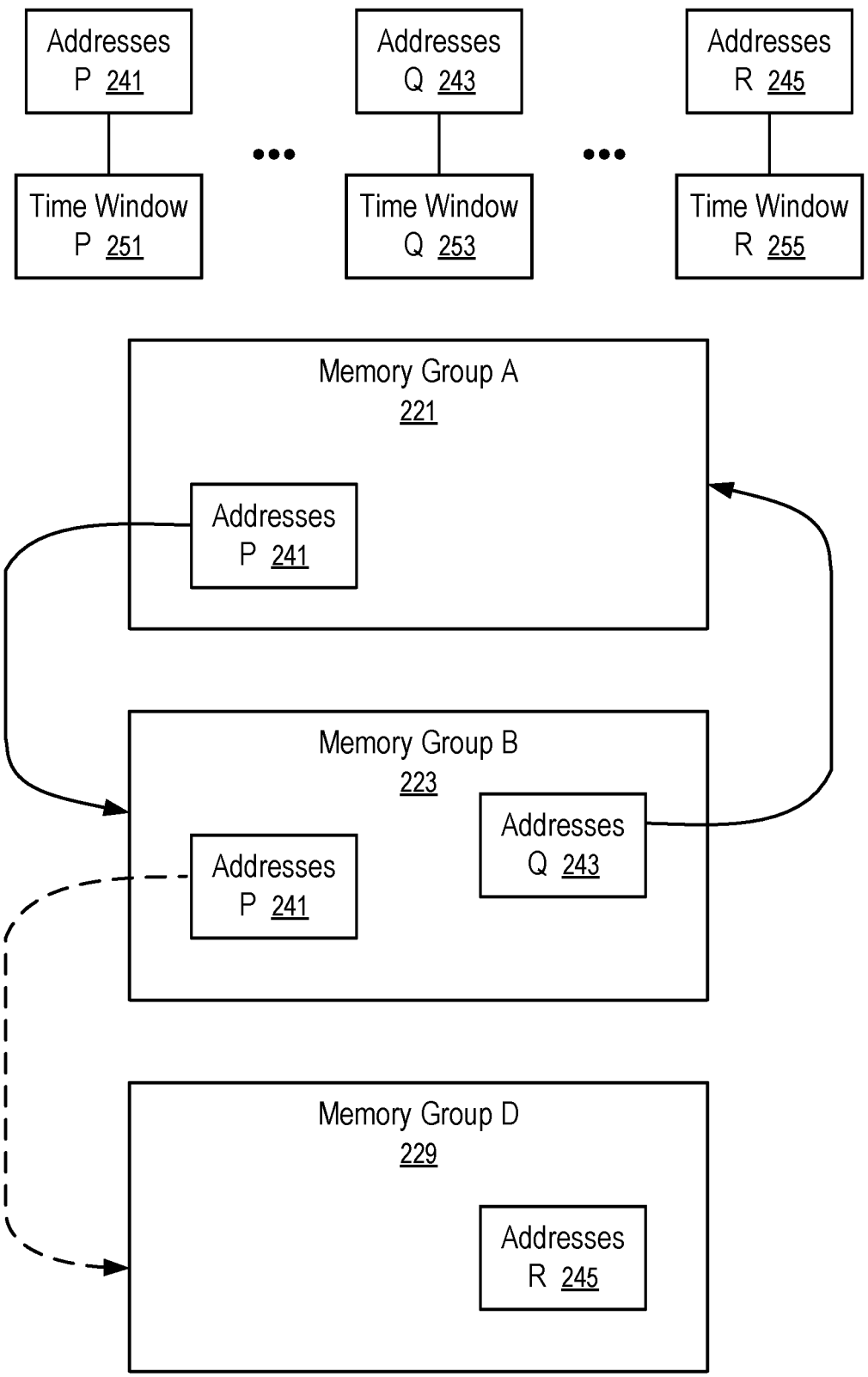
FIG. 8 illustrates a technique to adjust the mapping of memory addresses according to predicted timing of use to schedule low power modes for memory according to one embodiment.

FIG. 8 illustrates a technique to adjust the mapping of memory addresses according to predicted timing of use to schedule low power modes for memory according to one embodiment.

In FIG. 8, addresses (e.g., 241, 243, . . . , 245) have predicted time windows (e.g., 251, 253, . . . , 255) for their use. The time windows (e.g., 251) can be associated with the execution progress of the DLA instructions (205) in the Deep Learning Accelerator (DLA) (103).

For example, during the execution of a portion of the DLA instructions (205) in the Deep Learning Accelerator (DLA) (103), the memory addresses (241) are used in a time window (251). The memory addresses (241) can be mapped to the memory group (221). Thus, during the time window (251), the memory group (221) is in a normal operational mode (231).

For example, memory addresses (245) have predicted another time window (255) for its use. When the time window (255) starts after the time window (251), the memory addresses (245) can be mapped to the memory group (229). The memory addresses (e.g., 245) are mapped into the memory group (229) such that during the time window (251), or a portion of it, the memory group (229) is not used. Thus, the memory group (229) can enter a low power mode (e.g., 232) to reduce power consumption by the Random Access Memory (RAM) (105).

In one example, when the execution of the DLA instructions (205) reaches a point in the time window (251) where other memory addresses in the memory group (221) are not used. However, at the same time, the memory group (223) may be active, or close to be active (e.g., according to the time window (253) of the addresses (243)). Thus, the memory addresses (241) can be remapped to the memory group (223) such that the memory group (221) can enter a low power mode (e.g., 232).

Similarly, when the addresses (241) can be moved from the memory group (223) to another memory group (e.g., 229) to promote the memory group (223) into a low power mode (e.g., 232), the power manager (125) can adjust the memory map (127) to implement the move.

Typically, the move of a set of addresses (e.g., 241) includes the copying of the content from the memory cells from a memory group (e.g., 221) to another memory group (223). Optionally, such a data copying operation can be combined with the data refreshing operations of the memory groups.

In another example, when the execution of the DLA instructions (205) reaches a point in the time window (251) where the time window (253) of memory addresses (243) is about to start. However, the time windows of other addresses in the memory group (223) are still a time gap away. Thus, the memory addresses (243) can be remapped to the memory group (221) such that the memory group (223) can be in a low power mode (e.g., 232) for a longer period of time, after the addresses (243) are remapped to the active memory group (221). For example, memory group (223) can enter a low power but functional mode to facilitate the move and then enter a low power non-function mode after the move.

The power manager (125) is configured to implement memory address mapping and updating and to initiate low power modes for the memory groups (e.g., 221, 223, ..., 229) in maximizing the power consumption reduction and minimizing performance impact.

For example, when the DLA compiler (203) generates the DLA instructions (205), the DLA compiler (203) computes the timing of the usages of the memory addresses based on expected execution of the DLA instructions (205) in the Deep Learning Accelerator (DLA) (103). Based on the timing, the DLA compiler (203) computes a suggested scheme to group memory addresses and modifications of the grouping during the execution process of the DLA instructions. The grouping scheme and modifications can be computed to maximize reduction in power consumption and overall performance of the Deep Learning Accelerator (DLA) (103). The power manager (125) can adjust the memory map according to the grouping scheme and modifications. Optionally, the DLA instructions can include instructions to the power manager (125) to implement the memory grouping scheme and modifications during the execution of the DLA instructions.

In some embodiments, an external device can access the random access memory (105) in connection with the execution of the DLA instructions (205). The power manager (125) is further configured to manage the grouping of memory cells in the random access memory (105) to optimize power consumption and performance. The DLA compiler (203) can augment the Artificial Neural Network (ANN) (201) to include a portion that predicts the timing of memory usage in connection the execution of the DLA instructions (205) and computation results of Artificial Neural Network (ANN) (201). Thus, Deep Learning Accelerator (DLA) (103) can train the portion of the Artificial Neural Network (ANN) (201) configured to predict the memory usage timings to improve optimization in power consumption reduction and in the performance of the integrated circuit device (101) in servicing the external device.

Figure 9:
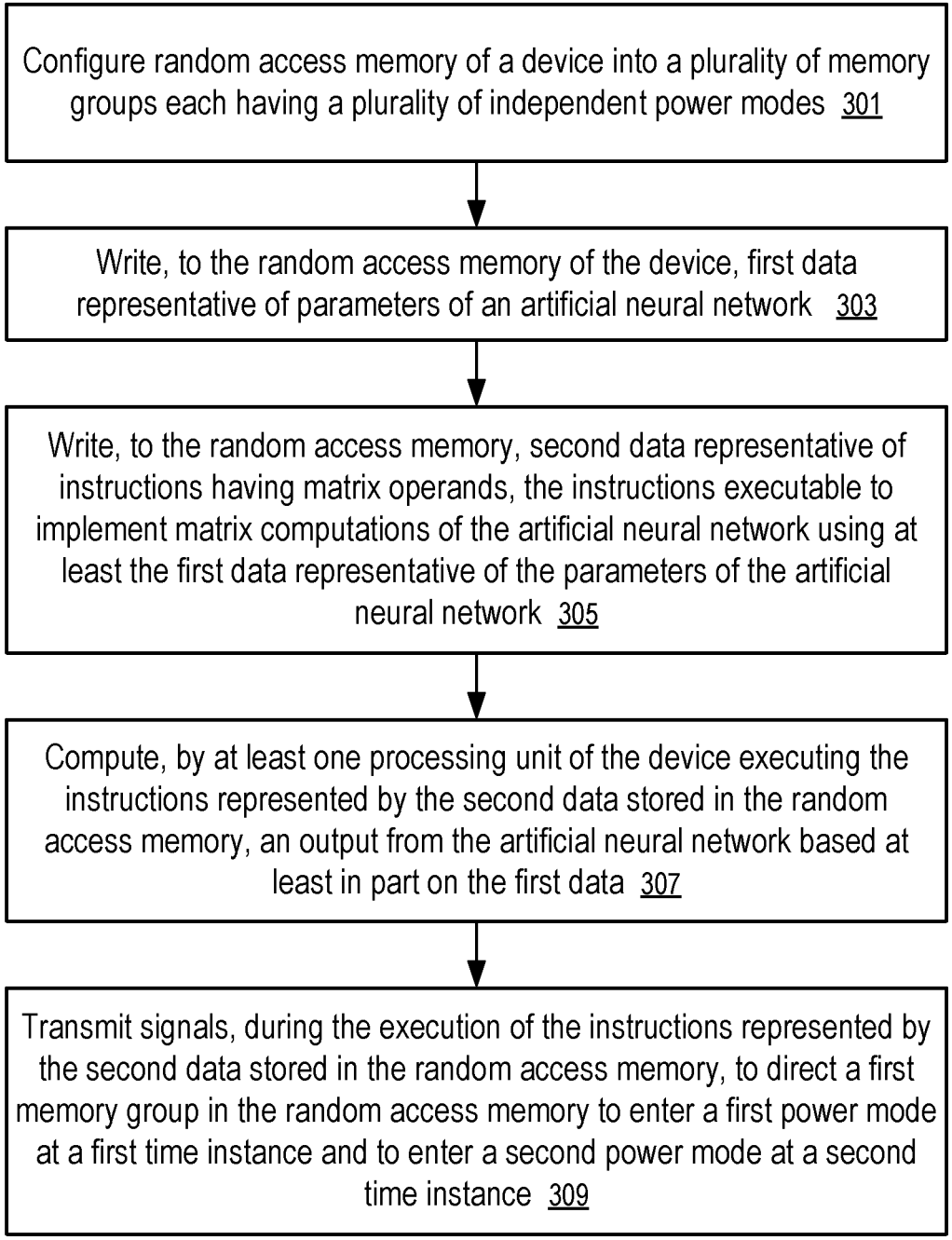
FIG. 9 shows a method of intelligent power management according to one embodiment.

FIG. 9 shows a method of intelligent power management according to one embodiment. For example, the method of FIG. 9 can be implemented in the integrated circuit device (101) of FIG. 1, FIG. 6, or FIG. 7, and/or the system of FIG. 5 using the technique of FIG. 8.

At block 301, random access memory (105) of a device (e.g., 101) is configured into a plurality of memory groups (e.g., 221, 223, ..., 229) each having a plurality of independent power modes (e.g., 232, 231).

At block 303, first data representative of parameters (e.g., matrices (207)) of an artificial neural network (e.g., 201) is written to the random access memory of the device (e.g., 101).

At block 305, second data representative of instructions (e.g., 205) having matrix operands is written to the random access memory (105). The instructions are executable to implement matrix computations of the artificial neural network (201) using at least the first data representative of the parameters (e.g., matrices (207)) of the artificial neural network (201).

At block 307, at least one processing unit (e.g., 111) of the device (e.g., 101) executes the instructions (205), represented by the second data stored in the random access memory (105), to compute an output (e.g., 213) from the artificial neural network (201) based at least in part on the first data representative of the parameters (e.g., matrices (207)) of an artificial neural network (e.g., 201).

At block 309, a power manager (e.g., 125) transmits signals, during the execution of the instructions (e.g., 205) represented by the second data stored in the random access memory (105), to direct a first memory group (e.g., 221, 223, or 229) in the random access memory (105) to enter a first power mode (e.g., 232) at a first time instance and to enter a second power mode (e.g., 231) at a second time instance.

For example, the first memory group (e.g., 221) can enter the first power mode (e.g., 232) at the first time instance independent of the power modes of second memory groups (e.g., 223, ..., 229) in the random access memory (105). The first memory group (e.g., 223) can also enter the second power mode (e.g., 231) at the second time instance independent of the power modes of the second memory groups (e.g., 223, ..., 229) at the second time instance.

For example, the first power mode can be a low power mode (232); and the second power mode can be a normal operational mode (231). Thus, the first memory group (e.g., 221) consumes less power in the first power mode (e.g., 232) than in the second power mode (e.g., 231).

For example, the first memory group (e.g., 221) can be powered at a first voltage in the first power mode lower than a second voltage in the second power mode, be operated according to a first clock frequency in the first power mode lower than a second clock frequency in the second power mode, and/or be powered off periodically when in the first power mode.

For example, the device (101) can include a memory map (127) configured to convert addresses used in the instructions (e.g., 205) represented by the second data into physical addresses of memory cells in the random access memory (105).

Further, an interface (e.g., 107) is configured to allow an external system to access the random access memory (105). Memory access requests received in the interface (e.g., 107) can be configured to use addresses that are to be converted via the memory map (127) to generate the physical addresses of memory cells in the random access memory.

The power manager (125) can adjust the memory map (127) to optimize the grouping of addresses used in the DLA instructions (e.g., 205) and the requests received in the memory controller interface (107) to enable optimized use of low power modes of the memory groups (e.g., 221, 223, . . . , 229) to reduce power consumption.

For example, the execution of the instructions (e.g., 205) by the at least one processing unit (111) can generate data identifying the first time instance and the second time instance computed by a portion of the artificial neural network (201). The portion of the artificial neural network (201) can be trained (e.g., using a machine learning technique) to optimize power consumption and performance based on test data set collected during prior executions of the DLA instructions (e.g., 205). The portion of the artificial neural network (201) can be trained to identify the optimized timing for switching power modes of the memory groups (e.g., 221, 223, . . . , 229) and/or the optimized group of memory addresses for mapping into the memory groups (e.g., 221, 223, . . . , 229) for their use of low power modes (e.g., 232). Thus, the adjustments to the memory map (127) and the power modes of the memory groups (221, 223, . . . , 229) can be dependent on the output (e.g., 213) of the Artificial Neural Network (ANN) (201).

In some implementations, the DLA compiler (203) computes or estimates the timing of the memory usages and generates instructions, as part of the DLA instructions (205), to cause the power manager (125) to implement changes in the memory map (127) and changes in the power modes of the memory groups (221, 223, . . . , 229).

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A device, comprising:
    random access memory having a plurality of memory groups, each of the memory groups configured with a plurality of power modes, the random access memory configured to store first data representative of parameters of an artificial neural network and store second data representative of instructions having matrix operands, the instructions executable to implement matrix computations of the artificial neural network using at least the first data representative of the parameters of the artificial neural network;
    at least one processing unit coupled with the random access memory and configured to execute the instructions represented by the second data to generate an output of the artificial neural network by performing the matrix computations on the matrix operands of the second data using the parameters of the artificial neural network in the first data stored in the random access memory; and
    a power manager configured to cause, during execution of the instructions represented by the second data, a first memory group in the random access memory to enter a first power mode at a first time instance and to enter a second power mode at a second time instance, wherein the first memory group and other memory groups of the plurality of memory groups are a same type of random access memory, wherein during the first power mode the first memory group is not being accessed, and further wherein during the second power mode the first memory group is being accessed.

2. The device of claim 1, wherein the first memory group is configured to enter the first power mode at the first time instance independent of power modes of second memory groups in the random access memory; and the first memory group is configured to enter the second power mode at the second time instance independent of power modes of the second memory groups.

3. The device of claim 2, wherein the first memory group consumes less power in the first power mode than in the second power mode.

4. The device of claim 3, wherein the first memory group is powered at a first voltage in the first power mode lower than a second voltage in the second power mode.

5. The device of claim 3, wherein the first memory group is configured to operate according to a first clock frequency in the first power mode lower than a second clock frequency in the second power mode.

6. The device of claim 3, wherein the first memory group is powered off periodically when in the first power mode.

7. The device of claim 3, further comprising:
    a memory map configured to convert addresses used in the instructions represented by the second data into physical addresses of memory cells in the random access memory.

8. The device of claim 7, further comprising:
    an interface configured to allow an external system to access the random access memory;
    wherein addresses received in the interface are converted via the memory map to physical addresses of memory cells in the random access memory.

9. The device of claim 8, further comprising:
    an integrated circuit die of a field-programmable gate array or application specific integrated circuit implementing a deep learning accelerator, the deep learning accelerator comprising the at least one processing unit, and a control unit configured to load the instructions from the random access memory for execution.

10. The device of claim 9, wherein the at least one processing unit includes a matrix-matrix unit configured to operate on two matrix operands of an instruction;
    wherein the matrix-matrix unit includes a plurality of matrix-vector units configured to operate in parallel;
    wherein each of the plurality of matrix-vector units includes a plurality of vector-vector units configured to operate in parallel; and
    wherein each of the plurality of vector-vector units includes a plurality of multiply-accumulate units configured to operate in parallel.

11. The device of claim 10, wherein the random access memory and the deep learning accelerator are formed on separate integrated circuit dies and connected by through-silicon vias; and the device further comprises:

an integrated circuit package configured to enclose at least the random access memory and the deep learning accelerator.

12. The device of claim 3, wherein execution of the instructions by the at least one processing unit generates data identifying the first time instance and the second time instance computed by a portion of the artificial neural network.

13. The device of claim 3, wherein the instructions represented by the at least second data include instructions causing the power manager to initiate the first power mode of the first memory group and to initiate the second power mode of the first memory group.

14. The device of claim 1, wherein the at least one processing unit is configured to communicate with the random access memory via a single memory interface.

15. The device of claim 1, wherein the first memory group and the second memory group are formed on a single integrated circuit die.

16. The device of claim 1, wherein the first memory group and the second memory group are formed on different integrated circuit dies.

17. The device of claim 1, wherein the first memory group is configured to operate in the first power mode while the second memory group operates in the second power mode.

18. The device of claim 17, wherein the first memory group is configured to operate in the second power mode while the second memory group operates in the first power mode.

19. A method, comprising:
writing, to random access memory of a device, first data representative of parameters of an artificial neural network and second data representative of instructions having matrix operands, the instructions executable to implement matrix computations of the artificial neural network using at least the first data representative of the parameters of the artificial neural network, the random access memory of the device having a plurality of memory groups, each of the memory groups having a plurality of power modes;
computing, by at least one processing unit of the device executing the instructions represented by the second data stored in the random access memory, an output from the artificial neural network by performing the matrix computations on the matrix operands of the second data using the parameters of the artificial neural network in the first data; and
transmitting signals, during the execution of the instructions represented by the second data stored in the random access memory, to direct a first memory group in the random access memory to enter a first power mode at a first time instance and to enter a second power mode at a second time instance, wherein the first memory group and other memory groups of the plurality of memory groups are a same type of random access memory, wherein during the first power mode the first memory group is not being accessed, and further wherein during the second power mode the first memory group is being accessed.

20. The method of claim 19, wherein the first memory group consumes less power in the first power mode than in the second power mode by reducing a power supply voltage, reducing a clock frequency, or by periodically turning off power supply, or any combination thereof.

21. The method of claim 20, further comprising:
converting, by a memory map of the device, first addresses used in the instructions represented by the second data into physical addresses of memory cells in the random access memory; and
adjusting the memory map according to timing of usages of the first addresses during execution of the instructions represented by the second data.

22. The method of claim 21, further comprising:
receiving requests in an interface of the device to access the random access memory, the requests identifying second addresses; and
converting, by the memory map of the device, the second addresses to physical addresses of memory cells in the random access memory in servicing the requests.

23. The method of claim 22, further comprising:
generating data identifying the first time instance and the second time instance computed by a portion of the artificial neural network from execution of the instructions represented by the second data stored in the random access memory; and
training the portion of the artificial neural network using performance data collected from execution of the instructions in the device to identify timing of low power modes of memory groups and adjustments of the memory map of the device.

24. An apparatus, comprising:
memory configured to store first data representative of parameters of an artificial neural network and store second data representative of instructions having matrix operands, the instructions represented by the second data stored in the memory executable to implement matrix computations of the artificial neural network based at least in part on the first data stored in the memory, the memory includes a plurality of memory groups, at least a first memory group in the plurality of memory groups configured with a plurality of power modes independent of power modes of second memory groups in the plurality of memory groups, the instructions including first addresses;
an interface coupled with the memory and configured to receive requests to access the memory, the requests including second addresses; and
a field-programmable gate array or application specific integrated circuit having:
a memory interface to access the memory;
a memory map configured to convert the first addresses and the second addresses into physical addresses of the memory;
at least one processing unit operable to execute the instructions represented by the second data stored in the memory and generate an output of the artificial neural network by performing the matrix computations on the matrix operands of the second data using the parameters of the artificial neural network in the first data stored in the memory; and
a power manager operable to adjust the memory map during execution of the instructions represented by the second data to cause the first memory group to enter a first power mode at a first time instance and to enter a second power mode at a second time instance, wherein the first memory group and the second memory groups are a same type of random access memory, wherein during the first power mode the first memory group is not being accessed, and further wherein during the second power mode the first memory group is being accessed.

25. The apparatus of claim 24, wherein the first memory group consumes less power in the first power mode than in the second power mode; and the first time instance, the second time instance, and adjustment to the memory map are based on a result of execution of the instructions represented by the second data stored in the memory.

26. A device, comprising:
- random access memory having a plurality of memory groups, each of the memory groups configured with a plurality of power modes, the random access memory configured to store first data representative of parameters of an artificial neural network and store second data representative of instructions having matrix operands, the instructions executable to implement matrix computations of the artificial neural network using at least the first data representative of the parameters of the artificial neural network;
- at least one processing unit coupled with the random access memory and configured to execute the instructions represented by the second data to generate an output of the artificial neural network based at least in part on the first data stored in the random access memory; and
- a power manager configured to cause, during execution of the instructions represented by the second data, a first memory group in the random access memory to enter a first power mode at a first time instance and to enter a second power mode at a second time instance, wherein:
  - the at least one processing unit includes a matrix-matrix unit configured to operate on two matrix operands of an instruction;
  - the matrix-matrix unit includes a plurality of matrix-vector units configured to operate in parallel;
  - each of the plurality of matrix-vector units includes a plurality of vector-vector units configured to operate in parallel; and
  - each of the plurality of vector-vector units includes a plurality of multiply-accumulate units configured to operate in parallel.

27. The device of claim 26, wherein the random access memory and a deep learning accelerator are formed on separate integrated circuit dies and connected by through-silicon vias; and the device further comprises:
- an integrated circuit package configured to enclose at least the random access memory and the deep learning accelerator.

* * * * *